(12) United States Patent
Schiffers

(10) Patent No.: US 6,612,207 B2
(45) Date of Patent: Sep. 2, 2003

(54) TURNING ASSEMBLY INCLUDING A PLURALITY OF TURNING BITS SIMULTANEOUSLY ENGAGING A WORKPLACE

(75) Inventor: Norbert Schiffers, Mönchengladbach (DE)

(73) Assignee: Sandvik AB, Sandviken (SE)

( * ) Notice: Subject to any disclaimer, the term of this patent is extended or adjusted under 35 U.S.C. 154(b) by 37 days.

(21) Appl. No.: 09/809,166

(22) Filed: Mar. 16, 2001

(65) Prior Publication Data

US 2001/0022123 A1 Sep. 20, 2001

(30) Foreign Application Priority Data

Mar. 16, 2000 (DE) ......................................... 100 12 821
Aug. 31, 2000 (DE) ......................................... 100 42 779

(51) Int. Cl.[7] .......................... B23B 29/00; B23B 29/24
(52) U.S. Cl. ......................... 82/1.11; 407/67; 407/117
(58) Field of Search ............................. 407/67, 68, 69, 407/77, 88, 91, 92, 113, 117; 82/1.11

(56) References Cited

U.S. PATENT DOCUMENTS

| 3,078,547 | A | * | 2/1963 | Sweet ........................ 407/68 |
| 3,163,918 | A |   | 1/1965 | Emmons |
| 3,922,766 | A | * | 12/1975 | Malinchak ................. 407/113 |
| 4,243,347 | A | * | 1/1981 | Clapp et al. ................ 407/15 |
| 4,573,832 | A |   | 3/1986 | Zinner |
| 5,119,703 | A | * | 6/1992 | Ruby .......................... 407/68 |
| 5,203,648 | A | * | 4/1993 | Bohannan et al. .......... 407/113 |
| 5,205,678 | A | * | 4/1993 | Britsch et al. .............. 407/104 |
| 5,256,008 | A | * | 10/1993 | Hansson et al. ............. 407/113 |
| 5,503,509 | A | * | 4/1996 | von Haas et al. ........... 408/188 |
| 6,126,364 | A | * | 10/2000 | Riviere ........................ 407/15 |
| 6,139,227 | A | * | 10/2000 | Schafer et al. .............. 407/109 |

FOREIGN PATENT DOCUMENTS

| DE | 2 315 044 | 10/1974 |
| DE | 32 41 748 | 5/1984 |
| DE | 84 06 371.8 | 5/1984 |
| DE | 34 42 102 | 6/1986 |
| DE | 42 40 295 | 6/1993 |
| DE | 93 00 465.6 | 6/1994 |
| DE | 200 17 747 | 2/2001 |

* cited by examiner

Primary Examiner—Jacob K. Ackun
(74) Attorney, Agent, or Firm—Burns, Doane, Swecker & Mathis, LLP

(57) ABSTRACT

A turning assembly for turning a workpiece includes a holder and plurality of turning bits mounted next to one another in a parallel relationship for simultaneously engaging a the workpiece. The turning bits are mounted in respective holding elements which are individually adjustably mounted in the holder. Spacers can be provided to space the turning bits apart. Safety devices are provided, each including an elastic element for frictionally retaining a respective turning bit and/or spacer within the holder to enable the holder to be manipulated without the turning bits and/or spacers falling out.

22 Claims, 15 Drawing Sheets

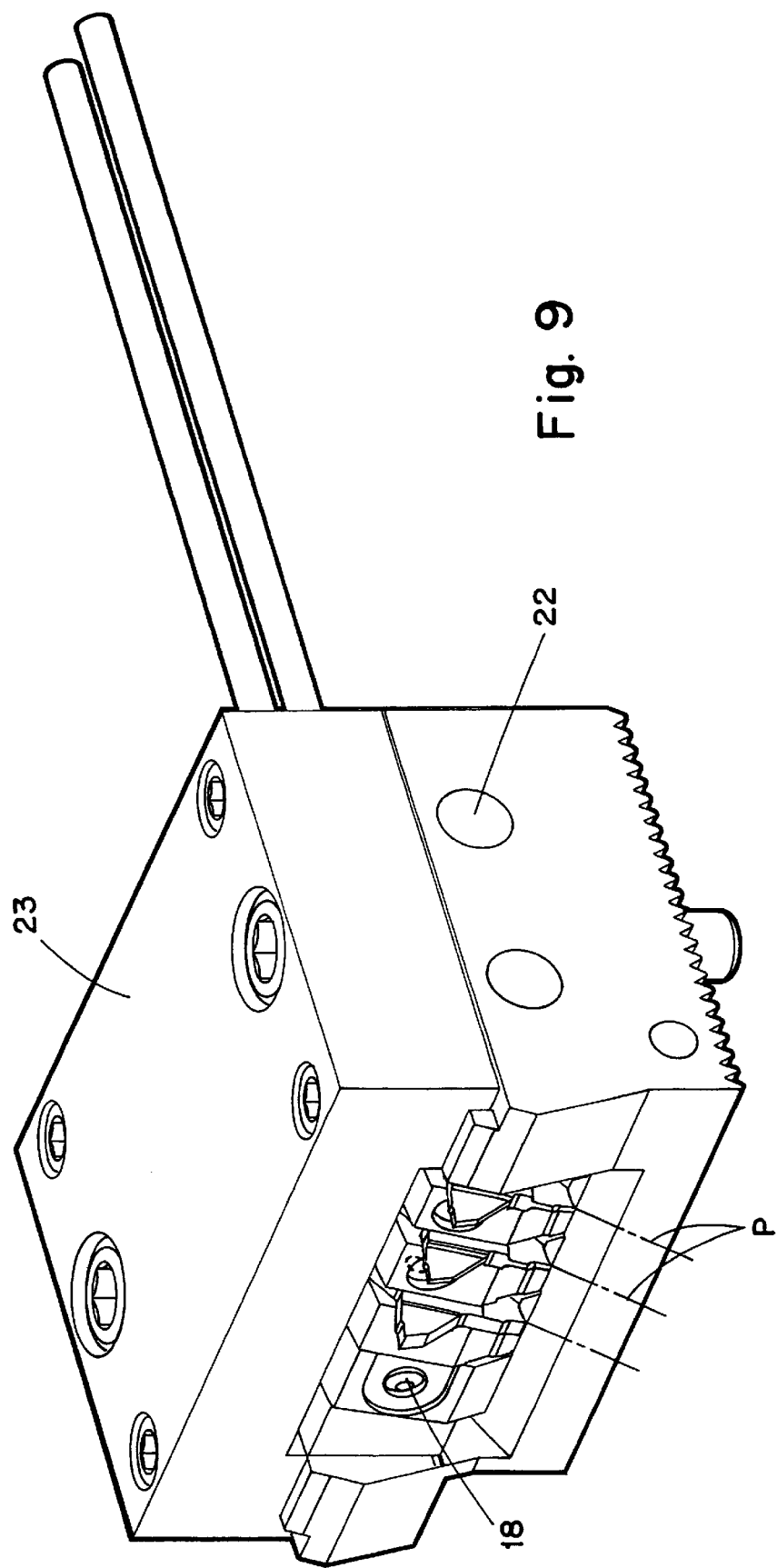

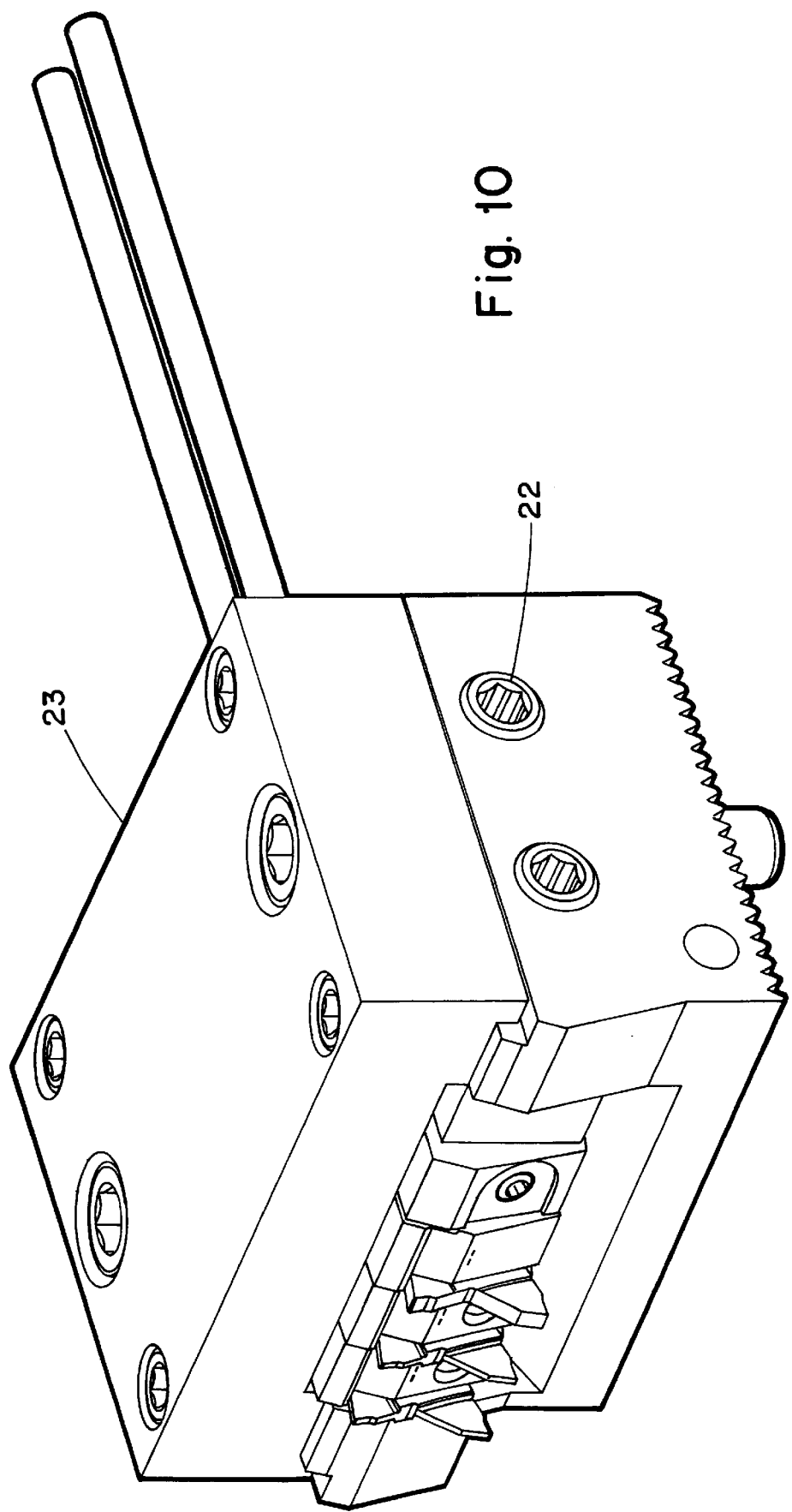

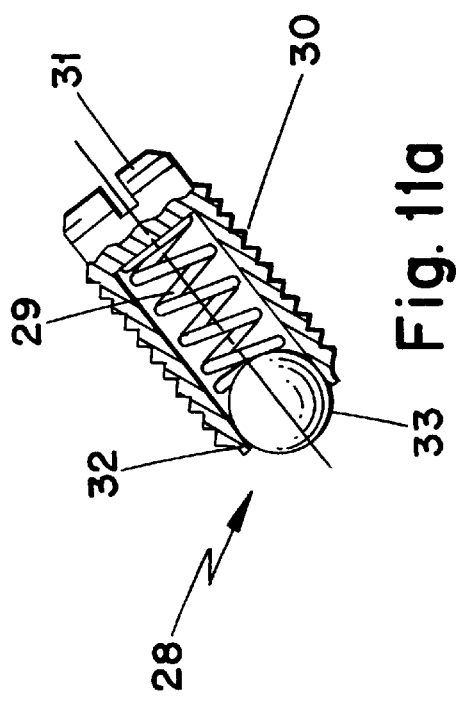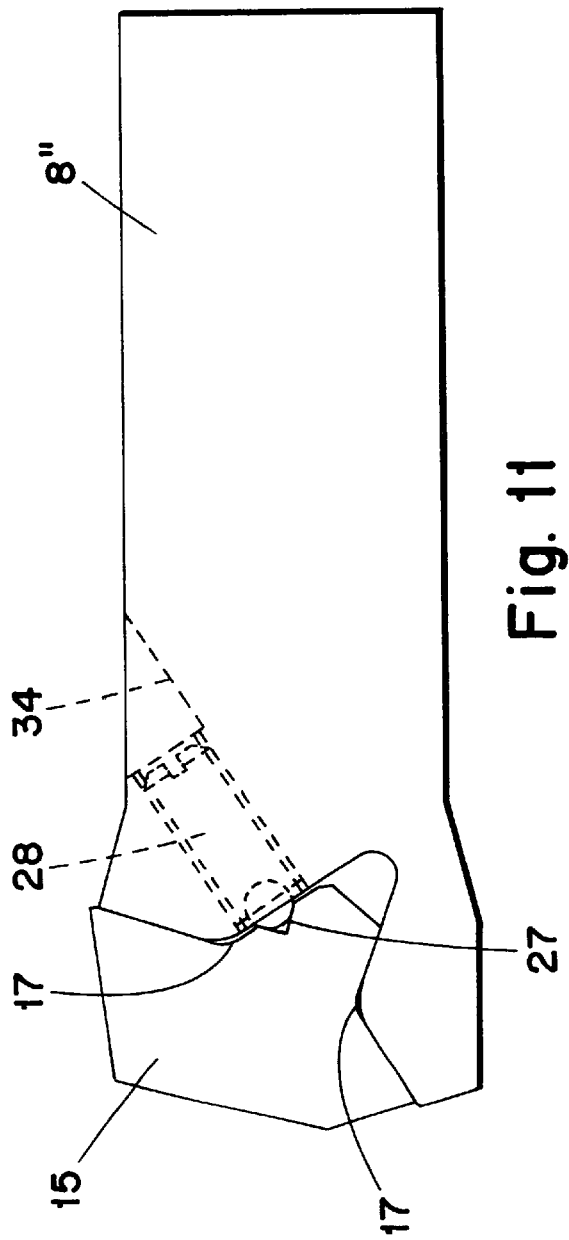

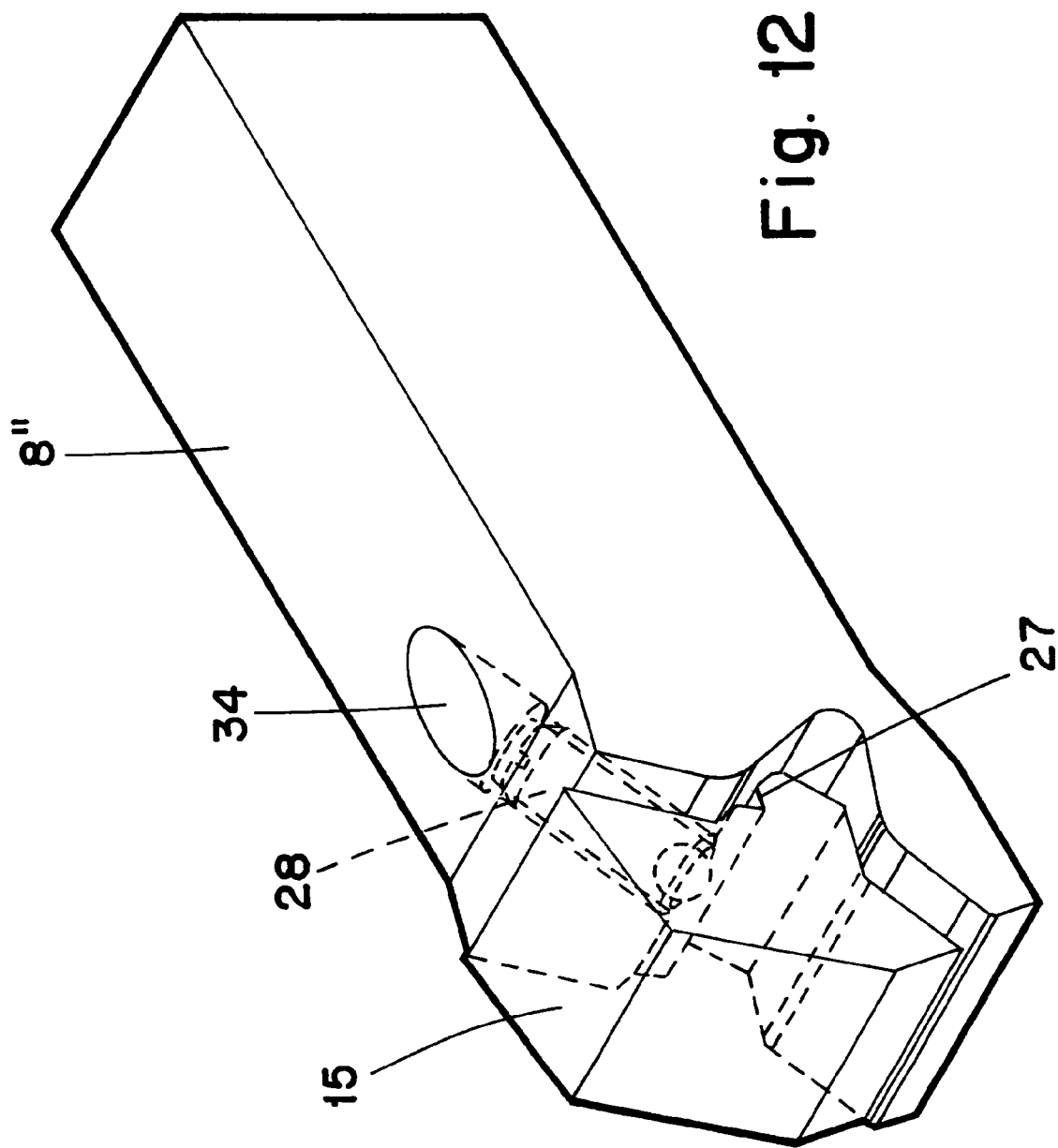

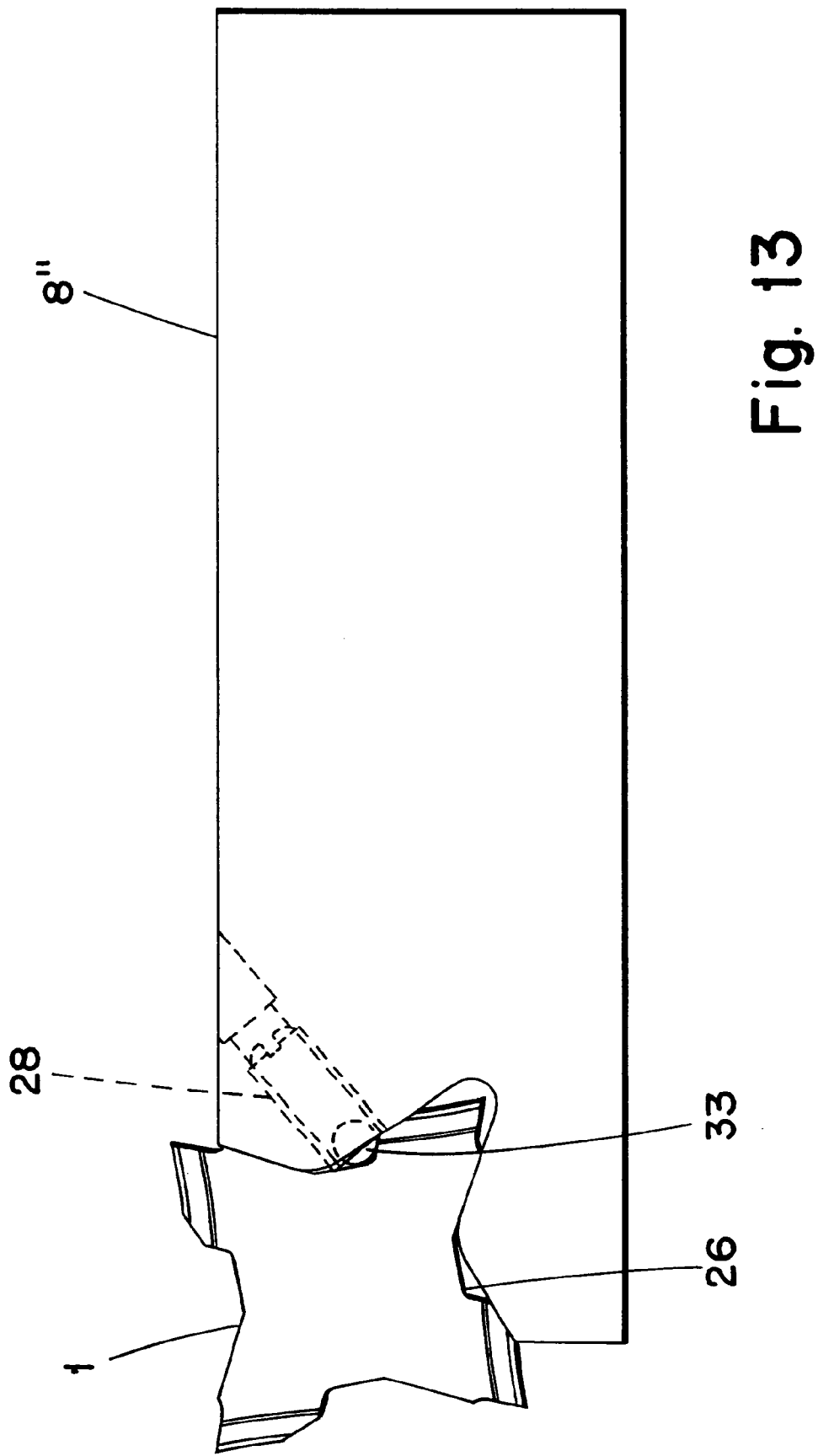

TURNING ASSEMBLY INCLUDING A PLURALITY OF TURNING BITS SIMULTANEOUSLY ENGAGING A WORKPLACE

RELATED INVENTION

This application claims priority under 35 U.S.C. §§119 and/or 365 to patent application(s) Ser. No. 100 12 821.1 and Ser. No. 100 42 779.0 filed in Germany on Mar. 16, 2000 and Aug. 31, 2000, respectively.

BACKGROUND OF THE INVENTION

The present invention relates to a cutting-bit bolder for turning tools, i.e., a cutting-bit holder for a turning machine. By "turning" is meant machining with a closed generally circular cutting movement by rotating the tool or the workpiece. Chipping takes place during a relative rectilinear feed movement between the workpiece and the tool in a direction perpendicular or parallel to the axis of rotation. By "axis of rotation" is meant the axis of rotation of the workpiece when the workpiece turns. If the workpiece is stationary and the tool rotates, e.g., in band-turning machines, facing tools and boring tools with boring bars on boring and milling machines, then the axis of rotation must be understood to be the axis of rotation of the rotating tool.

Such cutting-bit holders are available on the market in many versions. In general, a turning bit (or insert) such as a cutting or cutting-off bit is inserted into and screwed to the cutting-bit bolder. The cutting-bit bolder can then be connected to the turning machine. To carry out the cutoff process, the cutting-bit holder is then moved by the turning machine, for example toward the axis of the turning workpiece, so that the cutting insert fixed in the cutting bit holder engages with the workpiece and the latter for example is stripped or cut off.

However, the known cutting-bit holders have the disadvantage that, on the one hand, replacing the turning bit is very time-consuming and, on the other hand in particular when a plurality of grooves is to be incorporated into the workpiece or a plurality of disks is to be cut off from the workpiece, the cut-off process is very time-consuming. That is because the cutting-bit holder, together with the bit, must be moved individually in the direction of feed for each groove or each cut-off process. Moreover, in the case of these versions of holders, the cutting bit is held securely in the cutting-bit holder only after the adjustment of the cutting bit such that, in particular in the case of an overhead mounting, the cutting bit can slip or fall out of the bit holder.

The object of the present invention therefore is to provide a turning assembly, a turning bit, a bit holder, and a turning method for overcoming the above-named disadvantages.

SUMMARY OF THE INVENTION

According to the invention, this object is achieved in that the cutting-bit holder is provided for the holding of at least two turning bits (inserts). The turning bits are preferably arranged in the held position such that during the turning process, at least two turning bits can engage simultaneously with the workpiece. Because the cutting-bit holder can hold several turning bits and move them simultaneously in the direction of feed, the turning process can be clearly shortened. Thus, the invention also pertains to an improved turning method.

The turning bits are preferably held in the cutting-bit holder such that they stand essentially parallel to each other.

The cutting-bit holder is particularly preferably developed such that it has at least two holding elements which are each provided for the holding of a turning bit. Because each bit is held by its own holding element, replacement thereof is simplified.

A particularly preferred version provides that the holding elements are adjustable independently of each other in at least one direction, preferably in the direction of feed. Through this feature, the individual bits can be set independently of each other in the direction of feed. It is thereby possible for example to turn grooves of different depths into the work-piece simultaneously with the help of the cutting-bit holder. The bits which are to produce deeper grooves are easily advanced somewhat in the direction of feed together with their holding element vis-à-vis the other bits.

The cutting-bit holder expediently has a base body in which the holding elements are arranged, the holding elements being able to be fixed in the base body.

A particularly preferred version provides that a clamping device is arranged for the fixing of the holding elements in the base body. Through the fixing by means of the clamping device, the individual bit can be very quickly housed and fixed in the holding element. It is thereby guaranteed that the individual holding elements, after adjustment in the direction of feed, can be fixed easily and quickly. The holding elements are particularly preferably clamped by the clamping device in a direction which lies perpendicular to the direction of feed, preferably parallel to the axis of rotation.

Particularly expedient is a version of the cutting-bit holder in which the holding elements are able to be replaced. It is thereby possible to either replace the holding elements together with the bit, in order for example to have another bit available without delay, or simply to change a holding element and to mount the bit on the replaced holding element. This may for example be necessary when the clear distance between the different bits is to be changed, as a holding element with another width can then be advantageous.

The holding elements are preferably developed such that the cutting bits can be inserted into the holding element from the direction of feed.

Particularly preferred is a version in which the cutting-bit holder is provided for the heading of the bits in axial direction or longitudinal direction in at least two positions. By "longitudinal" direction is meant a direction parallel to the workpiece axis. Through this measure, the distance between two adjacent bits in the cutting-bit holder can be varied. Particularly preferred is a version in which the bits can be varied essentially continuously in the axial direction such that they can be securely fixed or held in almost every position. (It is understood that such a variability cannot be realized with a screw connection of the bit to the holding element or the cutting-bit holder.) A preferred version therefore provides for a clamping device for the fixing of the bits in the axial direction. With the help of this clamping device, this position can be fixed simply and above all quickly after the bits have been adjusted, i.e. have been positioned correctly both in the direction of feed and in the axial direction.

An expedient version provides that at least one spacer is provided for insertion between adjacent bits. In particular when not every bit is to be individually fixed or clamped to the holding element or in the cutting-bit holder, it is advantageous if a spacer is placed between two bits, the clear distance of which exceeds a specific value. The bits are then clamped to the spacer by the clamping device such that a type of sandwich clamping results. The high-precision adjustment of the clear distance between the bits is thus effected by the choice of thickness of the spacer. If the clear distance between two bits is to be increased, the use of another spacer or alternatively several spacers is necessary.

In a particularly preferred version, the holding elements are provided for the support or bearing of the bit essentially at three locations. The bit is firstly inserted into the holding element such that it touches the holding element at the three locations. Through the three locations, the position of the bit is precisely specified relative to die holding element. The fixing or clamping device then fixes bit in precisely this position. It is understood that the three locations need not actually be in the form of points, but as a rule represent precisely worked surfaces, preferably on the edge surfaces. The holding element then supports or bears the cutting-off insert essentially at three surfaces.

For some applications, it may be advantageous that each holding element has an attachment apparatus for the fixing of a bit in or at the holding element. Such an attachment apparatus can also be a screw connection. In particular when greater numbers of workpieces are to be produced, before for example the clear distance between the bits must be varied or the clear distance between the bits does not require a high degree of precision, the fixing of each individual bit at the holding element can be advantageous.

It is obvious that not every bit available on the market can be used in the cutting-bit holder according to the invention. A particularly suitable cutting bit has a main part as well as at least one cutting part having a cutting edge, the at least one cutting part having an essentially constant width. It is understood that a cutting part which for example has chamfers only in the area of the cutting edge in order to optionally achieve a more favourable distribution of the cutting forces, also has an essentially constant width. The cutting bits according to the invention described here can also advantageously be used in other cutting-bit holders.

A cutting bit with a square basic shape and four cutting edges is particularly preferred.

In a preferred version, the cutting bit has two side surfaces or also main surfaces as well as several edge surfaces or rim faces, the cutting edges being arranged at the edge surfaces. In addition, the cutting bit preferably has an indentation or recess on at least one side face. A holding clement is then particularly preferred which has a holding seat matched to the recess of the cutting bit. The cutting bit with its recess can thereby be placed on the holding seat of the holding element, so that this, exact position of the bit relative to the holding element results "automatically". Many types of recess can be realized, thus for example the edge surfaces of the bit can be curved concavely at the recesses. It is understood however that the edge surfaces need not necessarily be concavely curved, but for example can also be constructed essentially developed in a V-shape.

A particular version of the bit provides for at least two recesses. In this case, the holding element has a bit seat with not only a suitably shaped surface, but also two salients which are matched to the recesses of the bit. Thus it is possible to insert the bit even more precisely into the holding element, as holding element and bit now engage at two surfaces, matched to each other.

Particularly preferably, the main part of the bit has a greater width than the at least one cutting part. Through the variation of the width of the main part, the clear distance between two adjacent cutting bits can be varied without using a spacer, without changing the width of the cutting part (and thus the width of the groove to be cut). It is understood that the cutting part need not necessarily sit centrally on the main part. Rather the cutting part could also be arranged on the main part such that at one side of the bit, the surface of the main part and the surface of the cutting part lie on one level, whilst, on the other side of the bit, the surface of the cutting part and the surface of the main part lie on parallel levels such that a step is formed where the main part transforms into the cutting part.

The bit preferably has a cutting edge with a top face and a clearance face, the top face and clearance face forming an angle a which is less than 90°.

Particularly preferably, the cutting edge has a chamfer. In addition, a concavely curved section which favors chip forming and chip flow can be provided at the end of the top face.

Particularly preferably, the bit is developed such that it is orientated in the position when inserted into the cutting-bit holder such that a positive cutting rake or adjustment angle results during the cut-off process.

In a particularly preferred version, a safety apparatus is provided which secures a bit or a turning bit and/or a spacer in the tool seat, the safety apparatus having an elastic element which is arranged such that a turning tool or a spacer can be inserted into the tool seat and/or removed from this seat only upon exertion of a force on the elastic element. This ensures that the bit holder is capable of frictionally holding a bit or a turning bit and/or a spacer in the tool seat such that, although an axial positioning or adjustment of the turning bit or of the spacer is easily possible, an unintended falling-out or slipping-out of the turning bit and/or of the spacer from the tool seat of the cutting-bit holder is prevented. The cutting bit and/or the spacer is therefore inserted into the tool seat of the cutting-bit holder accompanied by exertion of a force. Depending on the version of the cutting bit or of the turning tool, in the position when inserted, either the elastic element can now exert a force on the turning tool or the spacer, so that this cannot fall out of the tool seat essentially because of the increased frictional force, or the safety apparatus can engage or lock in a positioning notch of the cutting bit or of the spacer, so that the cutting bit or the spacer can be released from the tool seat and then removed only upon exertion of a force on the elastic element. It is understood that such a safety apparatus according to the invention can be used to advantage with all cutting-bit holders with at least one tool seat for a turning bit or a spacer.

A version in which the elastic element has a spring is particularly preferred. The safety apparatus preferably has a sleeve in which the elastic element is arranged.

A particularly expedient version of the safety apparatus provides that a contact element is present which is provided for engagement with a turning bit or with a spacer when this is inserted into the tool seat. The contact element can, in choice of material and in configuration easily be matched to the material and shape of the turning bit or of the spacer or optionally of the positioning notch. Upon insertion of the turning bit or the spacer into the tool seat, the turning tool or the spacer comes into contact with the contact element. The contact element which is connected to the elastic element is then forced out of its idle position, against the spring force of the elastic element.

The contact element is preferably arranged on the side of the elastic element facing the tool seat inside the sleeve. It is then expedient if the sleeve tapers at the end facing the tool seat at least to the extent that the contact element cannot fully emerge from the sleeve at the end of the latter that faces the tool seat. In other words, the sleeve has at its one end a stop such that the contact element is pressed against the stop by the elastic element when neither turning tool nor spacer is inserted in the bit seat. Upon insertion of the turning bit or the spacer, the contact element is then pressed against the spring force slightly into the sleeve and away from the stop. When inserted, the elastic element then exerts a force on the turning bit or the spacer via the contact element, so that this cannot fall out of the tool seat.

Advantageously, the contact element can be rotated or swivelled about at least one axis. This easily allows a longitudinal adjustment of the bit whilst simultaneously a safeguard against the falling-out of the turning bit or the spacer from the cutting-bit holder or the holding element is ensured. The contact element can for example be a ball which is pressed by the force of the spring against the turning bit or the spacer and can be rotated about its own axis within the sleeve.

For some applications, it may be advantageous if an adjustment apparatus is provided with which the force which must be exerted on the elastic element during the insertion and/or during the removal of the turning bit and/or the space into or from the tool seat, can be set. It is thereby possible to set up a holding force of the safety apparatus matched to the application.

In the case of a particularly preferred cutting-bit holder, several safety apparatuses are provided. Advantageously, a safety apparatus is allotted to each turning bit to be housed and/or each spacer to be housed. This ensures that each individual spacer or each individual turning bit can be held securely in the cutting-bit holder or in the holding element.

As already mentioned, it is possible to hold the turning bit or the spacer in the cutting-bit holder solely due to the force exerted by the elastic element on the spacer or the turning tool via the contact element.

However a version in which the spacer and/or the bit has a positioning notch which is provided for engagement with a safety apparatus is particularly preferred. Upon insertion of the turning bit or the spacer into the tool seat of the cutting-bit holder, the contact element is pressed against the elastic element, so that this is compressed. In the process, the contact element engages with the external surface of the turning bit or of the spacer, At the moment when the spacer or the turning bit has assumed its correct seat in the cutting-bit holder, the contact element reaches the positioning notch of the spacer or of the turning bit, so that the elastic element can at least partially relax again and the contact element engages in the positioning notch. In other words, the contact element locks into the positioning notch. If the turning bit or the spacer is now to be removed again from tool seat of the cutting-bit holder, the elastic element must be compressed again so that the contact element can emerge from the positioning notch of the spacer or of the turning bit.

The turning bit comprises, according to the invention, a main part as well as at least one cutting part which has a cutting edge, the also having a positioning notch which is provided for engagement with a safety apparatus in the position when inserted into the bit holder.

The positioning notch is advantageously arranged essentially in the area of a recess of a side surface.

Particularly preferred a version of the bit which has several, preferably four, cutting edges, a positioning notch being allotted to each cutting edge. This facilitates a secure a holding of the cutting bit in the cutting-bit holder in every envisaged orientation of the cutting bit.

In a particularly preferred version of the cutting bit, the recesses are developed essentially in a V-shape, a positioning notch being arranged in only one V-leg. This arrangement of the positioning notch has the advantage that an unintentional incorrect insertion of the cutting bit into the bit seat is prevented, as there is then no positioning notch at the corresponding point at which the contact element of the safety apparatus is located. Consequently, given suitable development of the bit, the bit is held securely in the bit seat only when the cutting bit is arranged such that the cutting edge is arranged in the correct orientation.

BRIEF DESCRIPTION OF THE DRAWINGS

Further advantages, features and application possibilities of the present invention are using the following description of preferred versions as well as the associated figures, and wherein:

FIG. 11a is a broken-away view of the safety apparatus of FIG. 11, FIG. 12 a perspective view of a holding element with safety apparatus and fitted-on spacer, FIG. 13 a side view of a holding element according to the invention with safety apparatus and fitted-on cutting-off bit according to the invention, FIG. 14 a side view of a further version of the cutting-off bit, FIG. 15 a side view of an alternative version of a holding element according to the invention with safety apparatus and fitted-on cutting-off bit according to the invention and FIG. 16 a perspective view of the version of FIG. 15.

DETAILED DESCRIPTION OF PREFERRED EMBODIMENTS OF THE INVENTION

Figure 1:
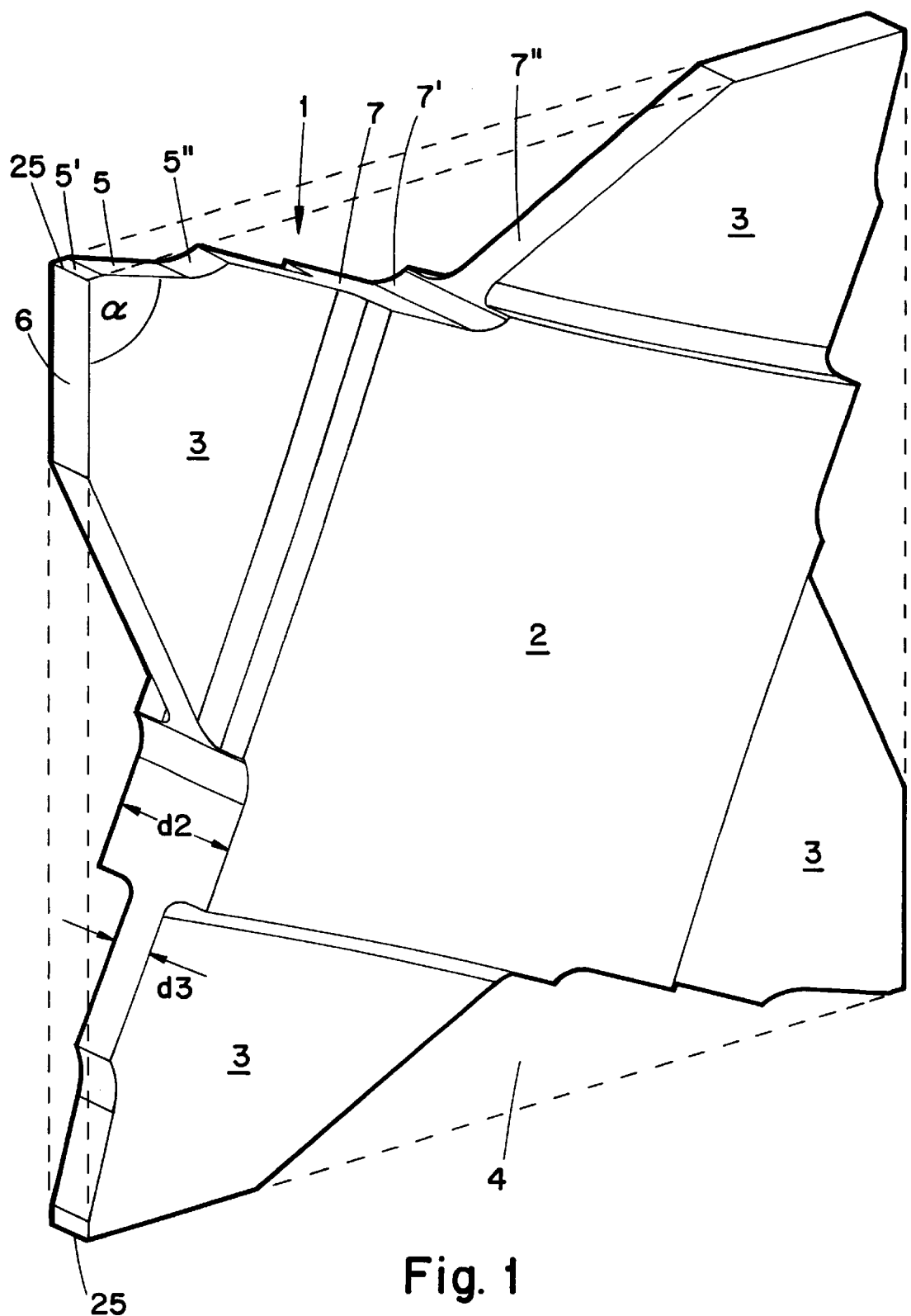
FIG. 1 a perspective view of a cutting-off bit according to the invention.

In FIG. 1, a version of a turning bit 1 according to the invention is shown. The bit can be a grooving bit, a cutt-off (parting) bit or any other suitable turning bit. The bit fits within an imaginary square indicated by dotted lines and comprises a main center part 2 as well as four cutting parts 3 projecting therefrom. The center part 2 and the cutting parts 3 are coplanar in the sense that there exists a common plane in which the center part and cutting parties lie. The cutting parts 3 have a constant width d3 which is less than the width d2 of the main part 2. The cutting-off bit 1 has four recesses or prismatic chambers 4. These prismatic chambers or recesses 4 extend to the main part 2. The prismatic chambers 4 are bordered by the edge surfaces 7, 7' and 7" of one cutting part 3, the main part 2, and another cutting part 3, respectively. It can be clearly recognized that the surface 7 has a narrow section and a wide section. The width of the narrow section corresponds to the width d3 of the cutting part. The width of the wide section corresponds to the width d2 of the main part. The edge 7" is a rear surface of a cutting part 3. The surfaces 7 and 7" are connected together by the concavely rounded surface 7'.

It can also be clearly recognized that the prismatic chambers 4 extend to the main part 2. The sides of each chamber diverge in an outward direction. Preferably, the prismatic chambers are essentially V-shaped, the legs, of the V-shape, i.e. the surfaces 7 and 7" are preferably inclined inwards by an angle of some 25°. In the version shown, the surfaces 6 and 7" likewise draw an angle of approximately 25°. However, it is conceivable for some applications to angle the clearance face 6 vis-á-vis the basic shape without the prismatic chamber changing in any way.

A cutting edge 25 is arranged on the cutting part 3. A front portion 5, 5', 5" and a clearance face 6 border this edge. The front portion is in turn divided into a top face 5, a chamfer 5' and a concavely rounded surface 5". The rounded surface 5" serves for chip forming and chip flow. The top face 5 and the clearance face 6 form an angle a of less than 90°.

Figure 2:
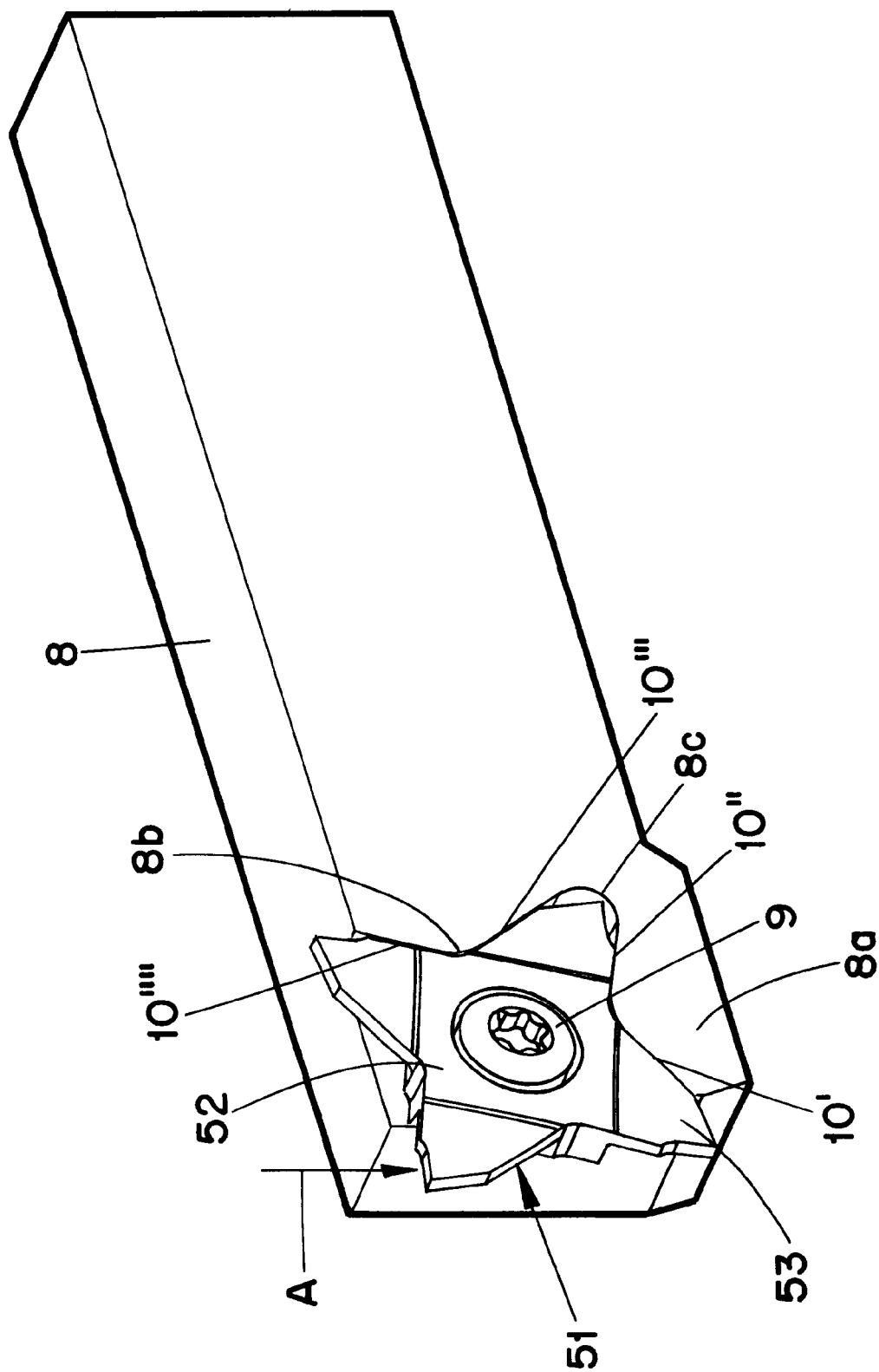
FIG. 2 a perspective view of a cutting-off bit mounted in a holding element.

In FIG. 2, a cutting-off bit 51 according to the invention is inserted into a holding element 8. The cutting-off bit 51 displays some differences as compared with the bit 1 shown in FIG. 1. Thus for example in the main part 52, there is an essentially central through bore so that, with the help of a fastener screw 9, the cutting-off insert 51 can be attached to the holding element 8. It can also be clearly seen that, in the version shown here, the cutting parts 53, which have a narrower width than the width of the main part do not line in a center plane through the main part, as in the case of the bit 1, so that the main part 52 projects further beyond the cutting parts 3 on one side (facing the holder) of the cutting-off insert than on the other. The main part 52 is still coplanar with the cutting parts 3, however, since a common plane can be drawn.

The holding element 8 has salients (i.e., forwardly projecting upper and lower protrusions 8*a*, 8*b*), corresponding to the recesses of the cutting bit, which define the bit seat. The protrusions define therebetween a pocket 8*c*, which has upper and lower rearwardly converging surfaces, e.g., see the converging surfaces 8*d*", 8*e*" in FIG. 4. There are also upper and lower forwardly facing end surfaces, e.g., see the end surfaces 8*f*' and 8*g*" in FIG. 4. The recesses 4 are developed such that the cutting bit sits on the holding element at three spaced-apart locations 10', 10" and 10''', e.g., formed by the surfaces 8*g*", 8*e*" and 8*d*", respectively, in FIG. 4. The position of the cutting bit at the level of the cutting bit relative to the holding element 8 is clearly determined by this three-location contact. It should be pointed out that the cutting or cutting-off insert can in principle also touch the holding element at a fourth location 10"". During use for the intended purpose, however, a force is exerted on the cutting-off bit 10 during the turning process in the direction of the arrow A, so that the bit would possibly no longer rest on the holding element at the location 10"".

Figure 3:
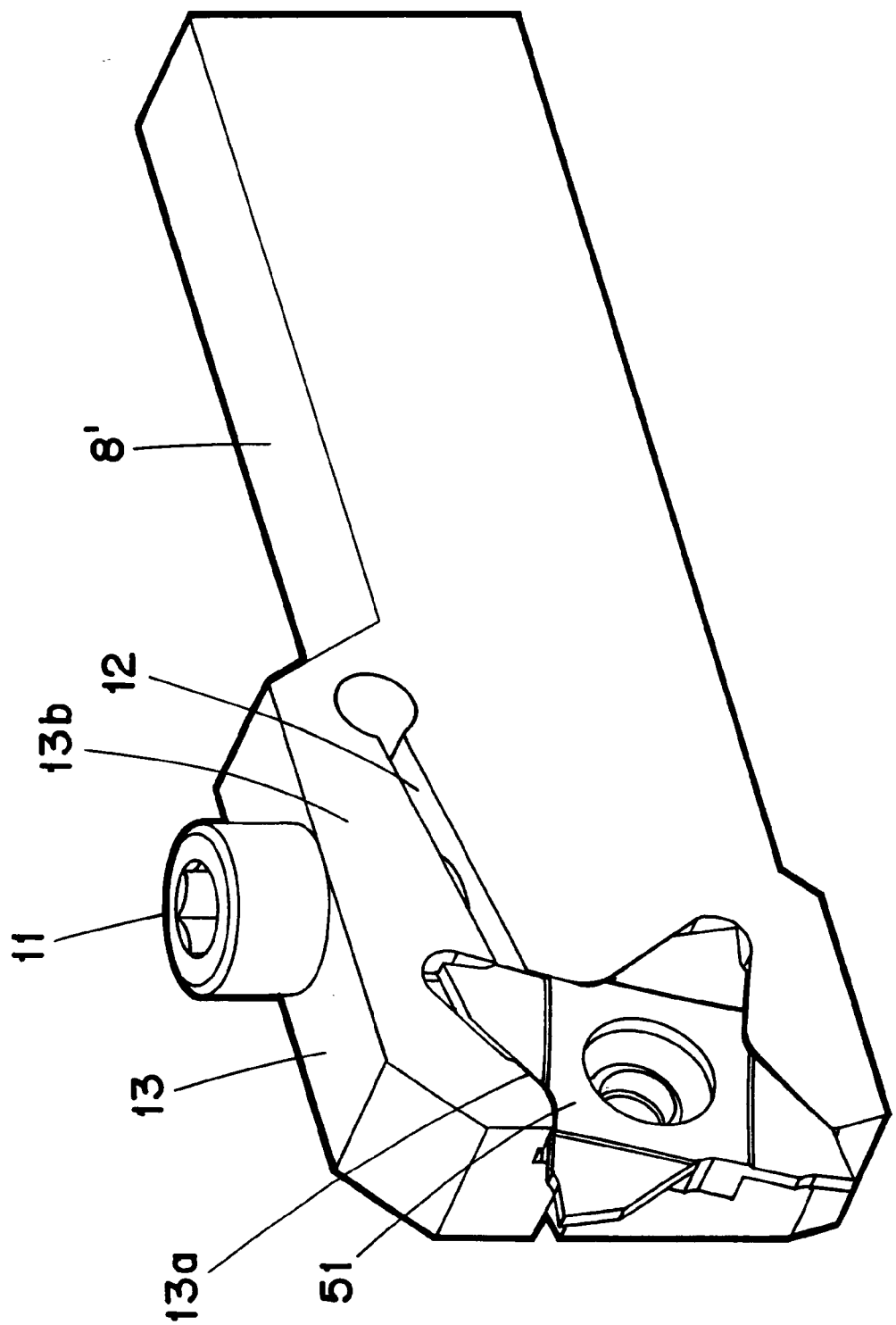
FIG. 3 an alternative version of the holding element of FIG. 2.

In FIG. 3, an alternative version of a holding element 8' is shown. Here also, the bit 51 is placed on the seat of the holding element. However, in this version, the bit 51 is not screwed to the holding element; rather the holding element has a fastener in the form of a clamping jaw 13 which, because of a recess 12, is somewhat moveable relative to a shank part of the holding element 8'. The jaw 13 has a seat 13*a* and a bending bar 13*b*, so that, with the help of a screw 11, the jaw 13 can be moved forward the cutting insert 51.

In this version, therefore, the bit 51 is firstly inserted into the holding element 81 such that the bit 51 comes into contact with the holding element at the locations 10', 10", 10''' shown in FIG. 2. The jaw 13 is then depressed by the screw 11, so that the bit 51 is fixed inside the holding element 8'. Instead of the integral bending bar 13*b*, a bar that is separated from the tool shank can be used.

Figure 4:
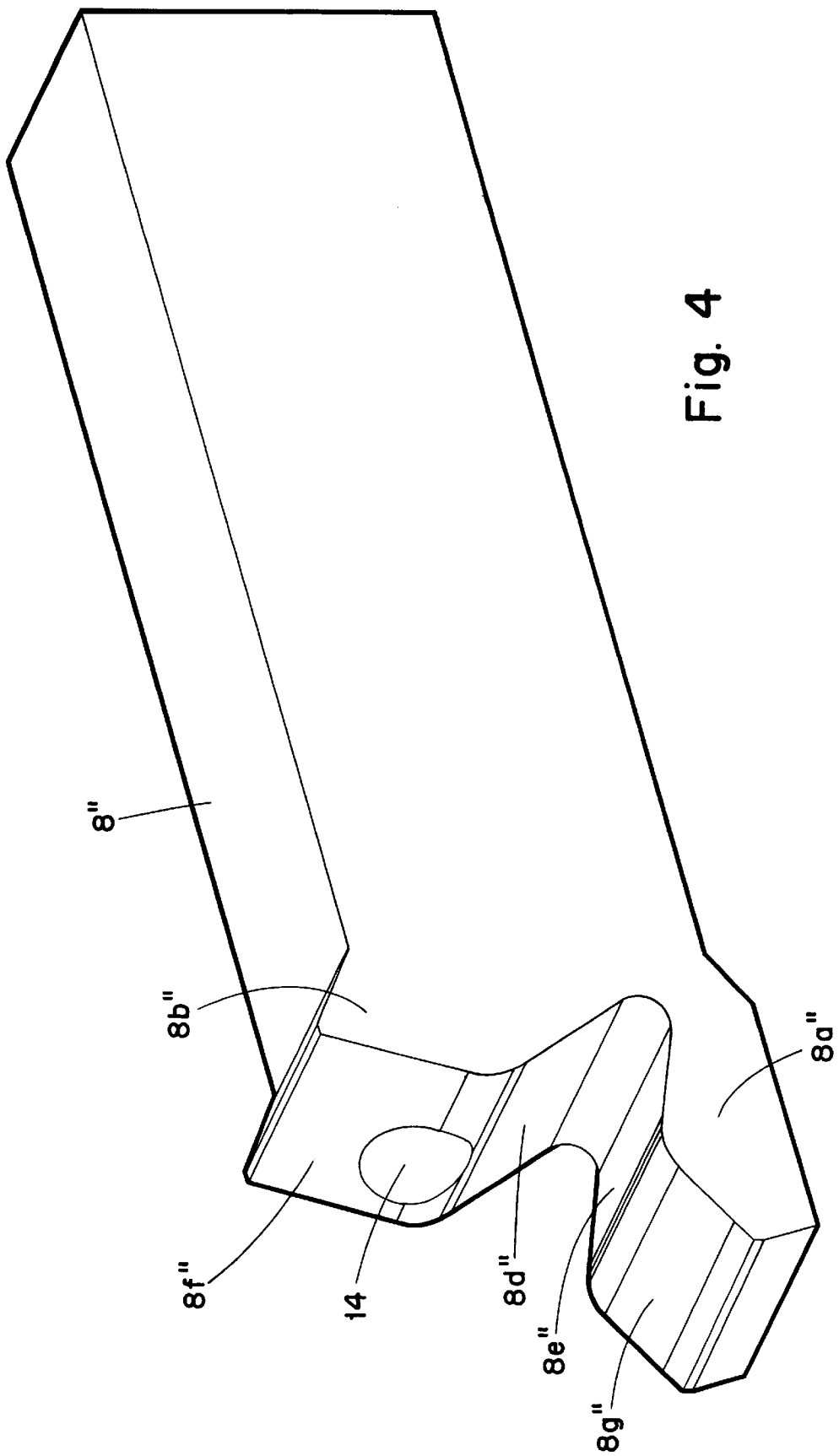
FIG. 4 a perspective view of a further version of the holding element.

In FIG. 4, a third version of a holding element 8" is shown. This holding element also has upper and lower protrusions 8*a*" and 8*b*". Those protrusions are similar to a chair, i.e., a seat 8*a*" and a rest 8*b*". The seat and the rest preferably correspond in shape to the shape of the prismatic chambers 4 of the bit 1 or 51. The holding element 8" has an opening 14, the purpose of which is explained below.

Figure 5:
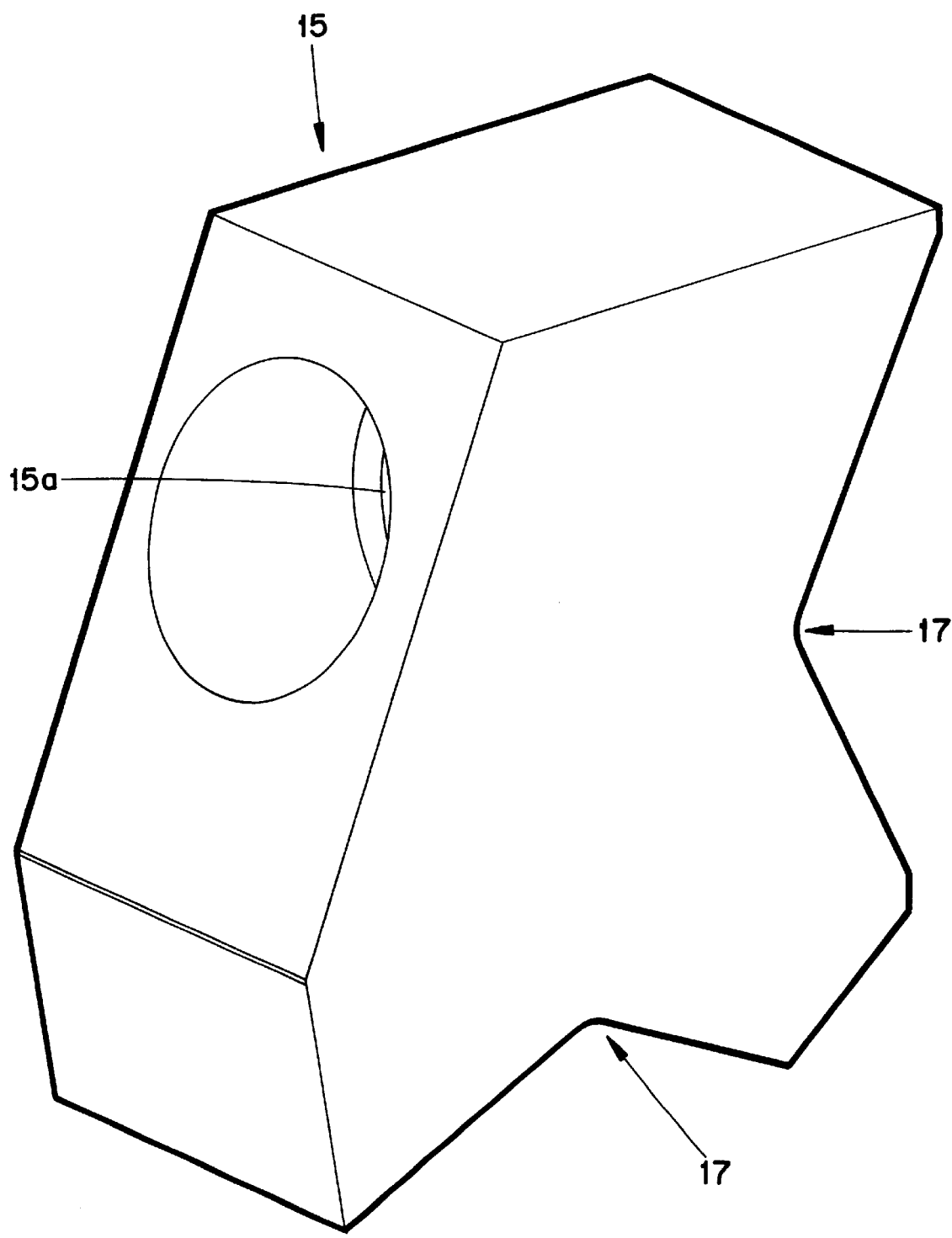
FIG. 5 a perspective view of a spacer.

In FIG. 5, a spacer 15 is seen in perspective view. This spacer 15 has two prismatic chambers 17 which are shaped such that the spacer 15 can be placed on the holding element 8" in form-locking manner (see FIG. 6). In addition, the spacer 15 also has a bore 15*a* which is explained below in connection with the opening 14 of the holding element 8".

Figure 6:
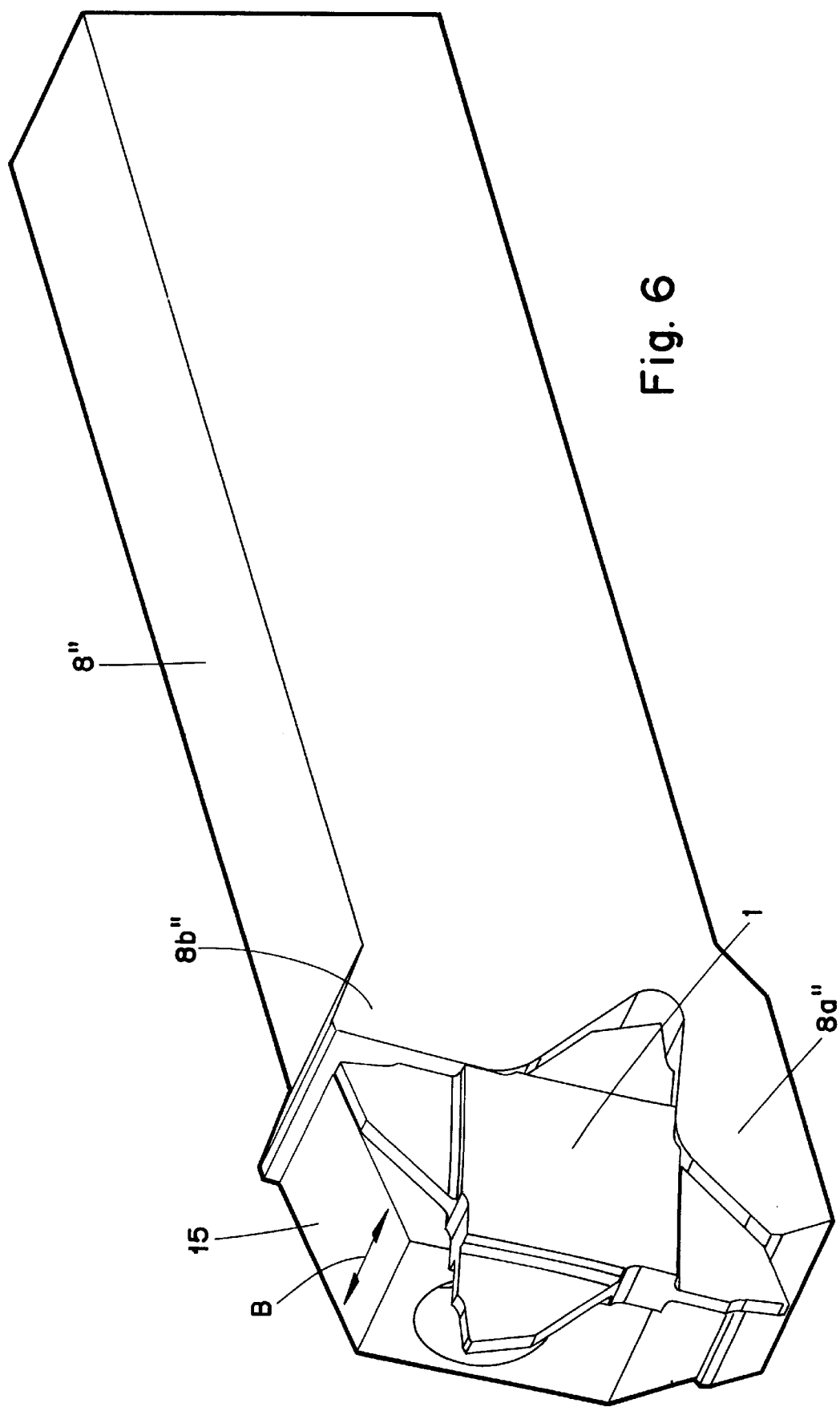
FIG. 6 a perspective view of a holding element with inserted spacer and cutting-off bit, FIG. 7 a perspective view of a clamping device, FIG. 8 a perspective view of the cutting-bit holder according to the invention in when a cover is removed, FIG. 9 a perspective view of the cutting-bit bolder in a first configuration, FIG. 10 a perspective view of a cutting-bit holder in a second configuration, FIG. 11 a sectional view of a holding element according to the invention with safety apparatus.

In FIG. 6, the holding element 8" is shown again. In this case, the spacer 15 and the bit 1 are inserted into the holding element 8". It can be clearly recognized that the prismatic chambers or recesses 4 of the bit 1 are matched respectively to the shape of the seat and rest of the holding element 8". The spacer 15 is also matched to the shape of the holding element 8". In the version shown, the bore 15*a* and the opening 14 of the spacer 15 and holding element 8", respectively, are essentially "in line." This does not mean however that the spacer 15 is screwed tight to the holding element 8". Although this can be advantageous for particular applications, in general, opening 14 serves to effect a crude attachment of the spacer 15 to the holding element 8". By "crude attachment" is meant that the spacer 15 is attached to the holding element 8" such that, although the spacer 15 cannot be completely removed from the holding element 8", the spacer 15 is movable at least to a limited extent in direction B, which is perpendicular to a plane of the turning bit and/or parallel to an axis of rotation of the workpiece (or of the turning bit) and which will be hereafter referred to as a longitudinal direction.

Figure 7:
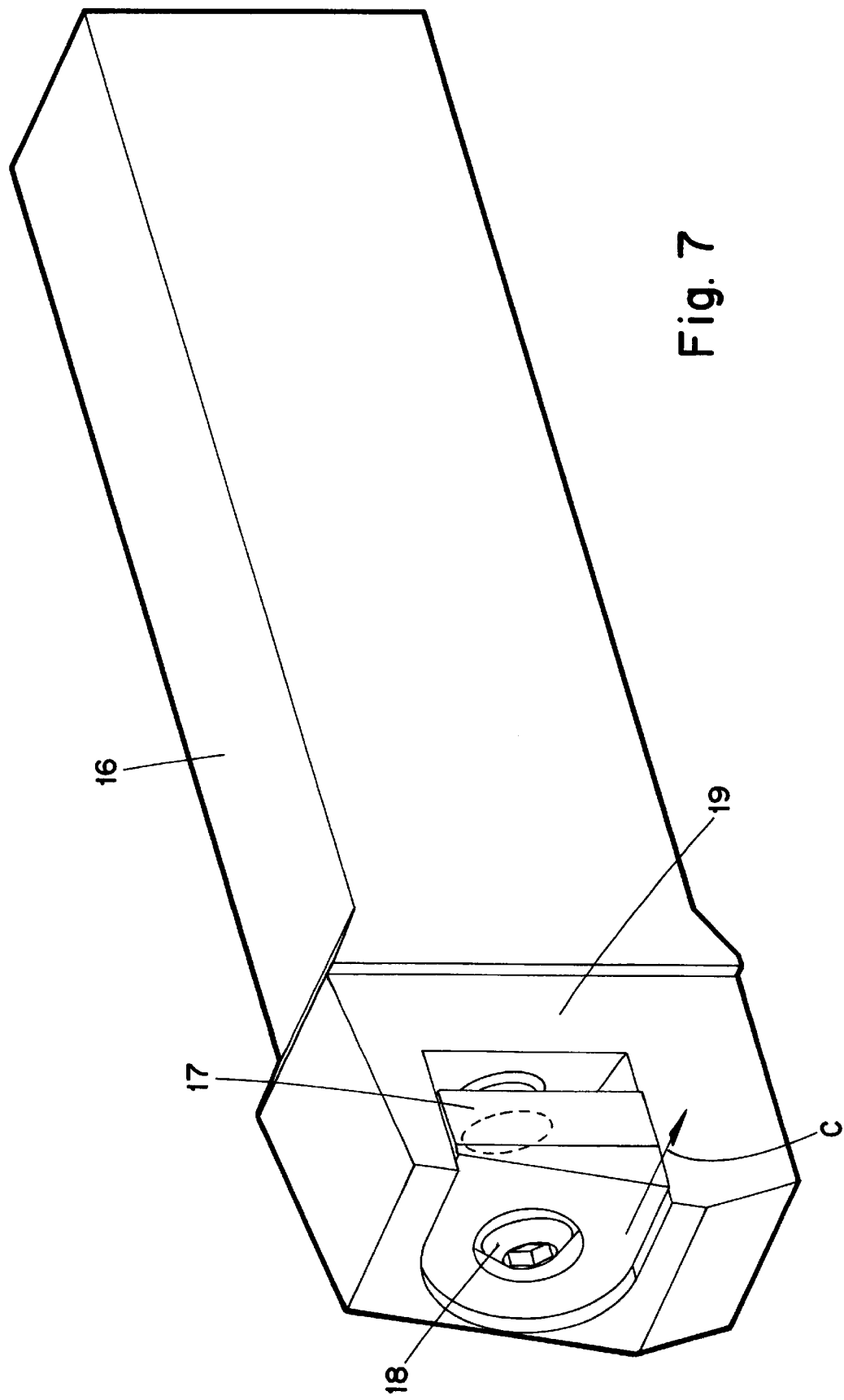

A clamping device 16 shown in FIG. 7 has a similar basic shape to the holding element 8". The device 16 is manufactured such that it can be used in a cutting-bit holder 20 as will be explained. The clamping device 16 has a key 17 which can be "keyed" with the help of the screw 18. By tightening the screw 18, the key 17 is displaced such that it projects from the housing 19 of the clamping device 16 in a direction of arrow C. For example, the screw 18 could be inclined in direction to effect such displacement of the key 17, or a head of the screw could be an eccentric.

Figure 8:
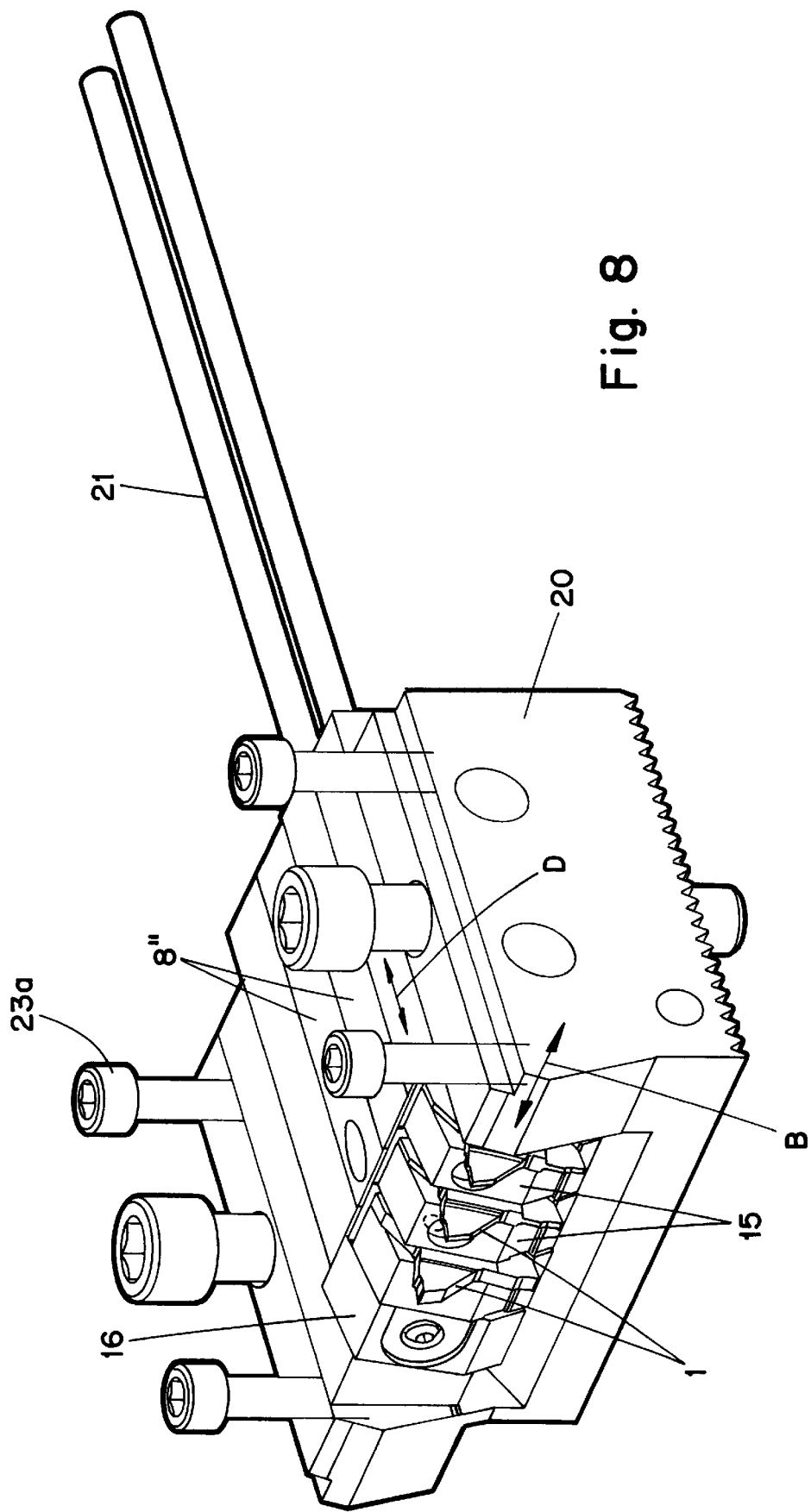

The actual cutting-bit holder 20 is shown in different stages of assembly in FIGS. 8 to 10.

In FIG. 8, the cutting-bit holder 20 is shown in an opened condition, i.e., a cover has been removed. The cutting-bit holder comprises of a basic body 20*a*. Holding elements 8" are inserted into this basic body, wherein the holding elements lie in respective parallel upright planes P that are spaced apart (see FIG. 9). The devices 8" are fitted with the spacers 15 and the bits 1. The-holding elements 8" can be adjusted individually in the direction of feed D. Associated with this is an individual setting possibility of the bits sitting in the holding elements 8". The setting of the bits in the longitudinal direction takes place with the with the help of the spacers 15. Thus spacers 15 and cutting bits 1 are selected such that they have a thickness to establish the desired clear distance between them when arranged against each other. In addition, the clamping device 16 is housed in the basic body 20a. Optional spring-loaded stripper bars 21 serve to strip off chips or chip rings and hold the spacers 15. In general, however, the bars 21 are not absolutely necessary.

In FIGS. 9 and 10, the cutting-bit holder 2c is shown with a fitted-on cover 23. Thus the holding elements 8" are firstly inserted when the cover 23 of the basic body 20 is removed. The individual cutting-off bits 1 are then selected and inserted together with the corresponding spacers 15 into the holding elements 8". The holding elements can be set in the direction of feed D. Only when the cutting bits are in the correct position in both the direction of feed and in the longitudinal direction B are the bits 1 and the spacers 15 compressed and fixed by the clamping device 16, i.e., by tightening the screw 18. Finally, the holding elements 8" are pressed against each other by tightening some clamping screws 22. Finally the cover 23 is placed onto the basic body 20 and screwed tight by screws 23a. The individual cutting-off bits 1 are thus then fixed in the desired manner.

In the case of the embodiment shown, several bits 1 are clamped in series by a clamping force with the help of the clamping device 16 and the spacers 15, but also are held in the bit seat by the prismatic shape of the bits 1. Through the adjustable holding elements 8", an individual cutting-off depth can be set for each bit 1. The spacers are connected to the adjustable holders by spring-loaded screws. The adjustable holders are fixed by two screws inserted in the block and the cover independently of the bit clamping.

As previously mentioned, it can happen, in particular in the case of an overhead mounting, that individual spacers 15 or bits 1 fall out of the bit seat before they are fixed by the clamping device 16. A safety apparatus 28 according to the invention prevents this. The safety apparatus 28 is best shown in FIG. 11a. The holding element 8" has a bore 34 here which extends to the bit seat. The safety apparatus 28 is inserted or screwed into this bore 34. The safety apparatus 28 consists here of a sleeve 30 in which a spring element 29 and a contact element developed as a sphere 33 are housed. The sleeve 30 is tapered at its end facing the bit seat or has stops 32 to ensure that the spherical contact element 33 cannot fall out of the sleeve. The safety apparatus 28 is so arranged that the contact element 33 extends beyond the bore 34 into the bit seat. Likewise, a spacer 15 inserted into the bit seat is shown in FIG. 11. The spacer 15 has two prismatic chambers 17 which are developed such that they roughly follow the contour of the bit seat of the holding element 8". It can be clearly recognized that the spacer 15 in the inserted state exerts a force on the contact element 38, so that the spherical contact element 33 is somewhat pressed into the bore 34 against the spring force of the elastic element 29. In the inserted state, the contact element 33 therefore exerts a holding force on the spacer 15 due to the taut spring 29, so that the spacer cannot fall out of the bit seat. In the particularly preferred version shown here, the spacer 15 has a recess or positioning notch 27 which is arranged such that, in the inserted state, the contact element 33 engages in the positioning notch. Although the force exerted by the contact element 33 on the spacer is thereby somewhat reduced again as the contact element 33 can now emerge again somewhat further out of the bore 34 in the direction of the bit seat, a removal of the spacer from the bit seat is however possible only when the spherical contact element 33 is again pressed into the bore 34 against the spring force of the elastic element 29.

This version has the advantage that the spacer 15 can now be easily moved in the longitudinal direction B, but an unintentional falling-out of the spacer 15 from the bit seat is effectively prevented by the spherical contact element 33 of the safety apparatus 28 which frictionally engages in the positioning notch 27 of the spacer 15.

In the version shown, the sleeve 30 has an external thread screwed into the bore 34. With the help of the screw head-like head 31 of the sleeve 30, the extent to which the safety element 28 or the sleeve 30 is to be screwed into the bore 34 can therefore be set. The holding force which the spherical contact element 33 exerts on the spacer 14 or on the bit 1 can thereby be set.

A perspective view of a holding element 8" with fitted-on spacer 15 is shown in FIG. 12. For clarification, the internal parts which are not normally visible in a perspective view are shown by dotted lines. It can be clearly recognized that the bore 34 extends in the direction of the bit seat or of the spacer 15. The safety apparatus 28, whose contact element 33 engages in the positioning notch 27 of the spacer 15, is fitted inside the bore 34. In the version shown, the positioning notch 27 extends across the complete width of the spacer 15, i.e., in the longitudinal direction B.

A holding element 8" with the safety apparatus 28 according to the invention is shown in FIG. 13, a bit 1 being arranged in the bit seat of the holding element 8". The bit 1 also has a positioning notch 26 in which the contact element 33 of the safety apparatus engages. Here, too, an easy adjustability of the bit in the longitudinal axial direction B is ensured, whilst an unintentional falling-out or slipping-out of the bit 1 from the bit seat of the holding element 8" is prevented. In the version shown here, the contact element 33 exerts only a very slight holding force in the position shown. If the bit 1 is to be removed from the bit seat of the holding element 8", the spherical contact element 33 must however be forced into the bore 34 against the spring force of the elastic element 29.

Figure 14:
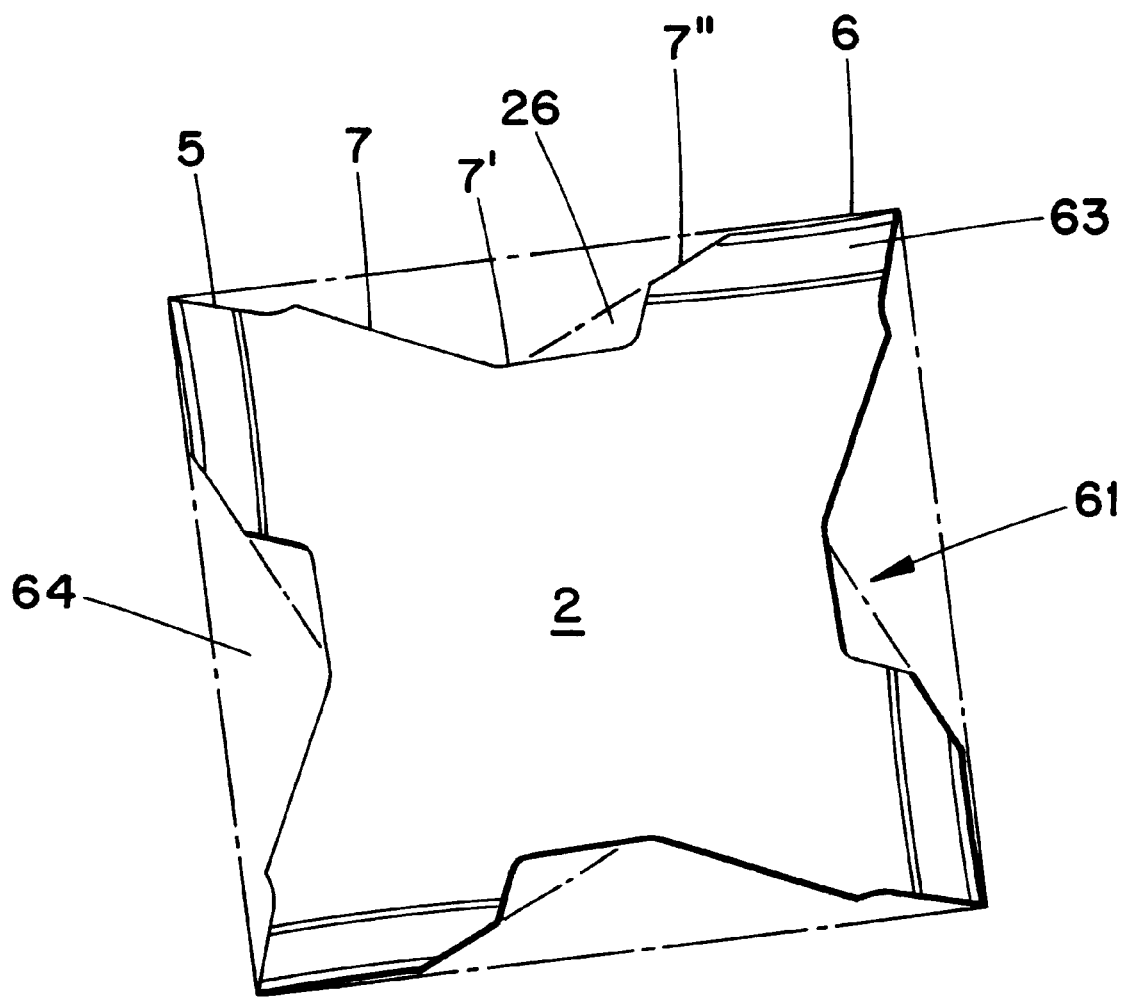

The bit 61 is shown, once again, enlarged in FIG. 14. This representation essentially corresponds to the representation of FIG. 1, except that the four cutting parts 63 are smaller in this case. Here, too, there are four prismatic chambers 64 which are defined by the edge surfaces 7, 7' and 7". The positioning notch 26 is arranged in the surface 7".

This arrangement of the positioning notch 26 also has the advantage that in the case of an unintentional incorrect mounting, i.e. an insertion of the bit 1 in an orientation in which it is not the envisaged cutting edge 25 but rather the clearance surface 6 that is orientated in the cutting direction, the bit does not "lock", as the positioning notch 26 cannot then be brought "into line" with the bore 34, so that the spherical contact element 33 cannot engage in the positioning notch 26. Accordingly, a secure holding of the bit 1 inside the bit seat of the holding element 8" is not ensured. In this case, it is established immediately with manual fitting that the bit 1 is not arranged in the correct orientation, so that the error can be corrected immediately. The operational and process reliability of the turning system is thereby considerably improved.

Figure 15:
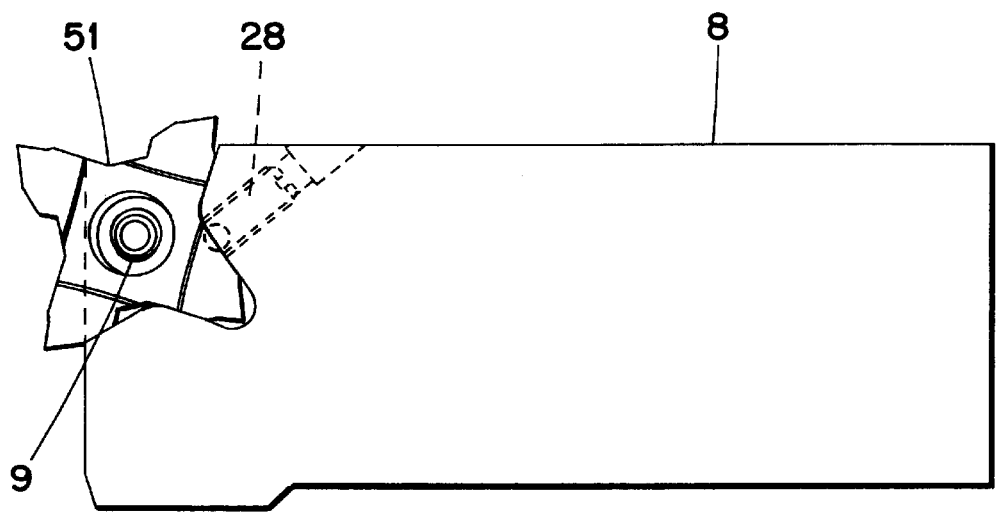
Figure 16:
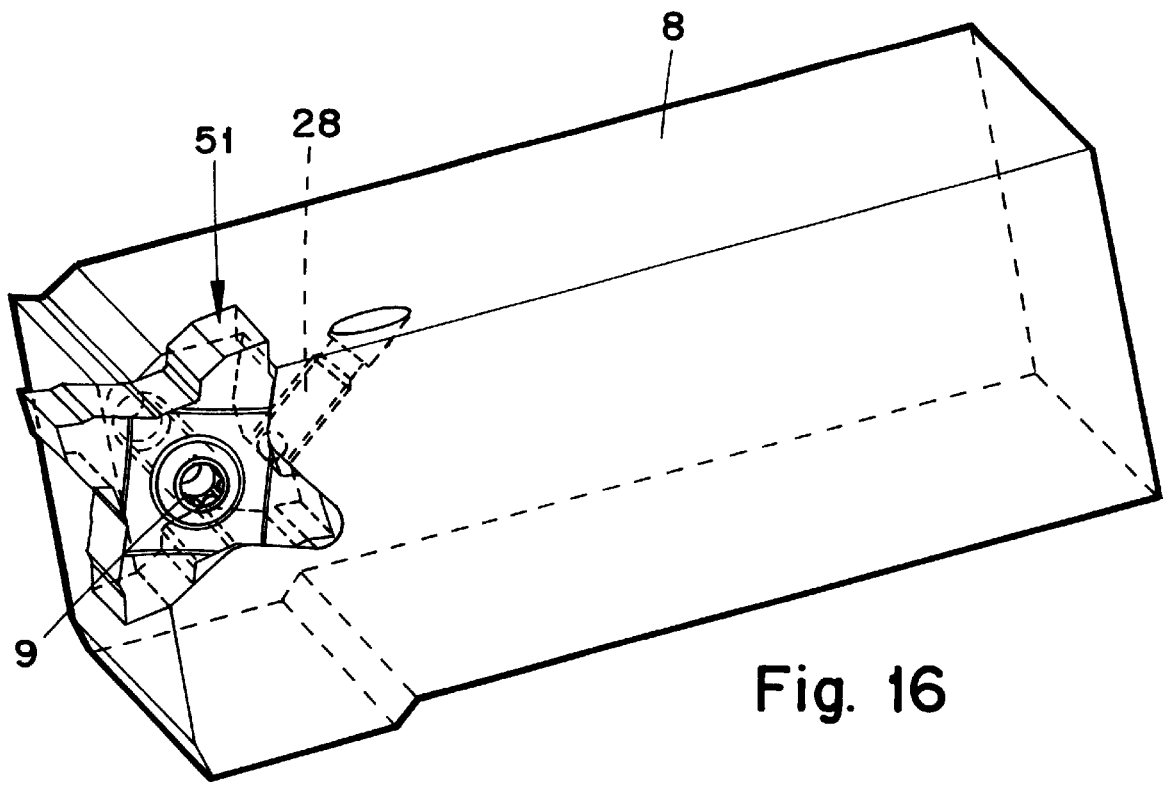

In FIGS. 15 and 16, an alternative version of the cutting-bit holder according to the invention with safety apparatus is shown. This differs from the version of the previous figures merely in that here the holding element 8 is not provided with a clamping device; rather the bit is attached to the holding element with the help of a screw 9. Accordingly, the version of the bit 51 shown in FIGS. 15 and 16 has a through-bore lying approximately in the center which is used to attach the bit to the holding element. Here, too, the mounting of the bit on the holding element is clearly simplified because of the safety apparatus 28. The bit 1 merely be inserted into the bit seat until the safety apparatus 28 "locks". The bit can then be screwed tight to the holding element 8.

Through the cutting-bit holder according to the invention, several turning tools can engage in the tool simultaneously in one work step with one turning machine. The furnishing time can thus be clearly shortened. It is understood that the tool holder can be used not just with cut-off bits. In principle, all other forms of turning bits are possible. Through the combination of different widths of the main parts of the cutting inserts and/or different widths of spacers, many profiles can be quickly and easily produced at the workpiece.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed is:

1. A turning assembly comprising a holder and a plurality of turning bit holding elements mounted in the holder, the holding elements spaced apart within the holder and lying respectively in spaced-apart parallel upright planes, each holding element including a front end forming a bit seat for receiving a turning bit, the seat comprised of a pair of forwardly projecting upper and lower protrusions defining therebetween a pocket, the pocket having upper and lower rearwardly converging surfaces formed by respective ones of the protrusions, the protrusions including respective generally forwardly facing upper and lower end surfaces extending away from a forwardly open mouth of the pocket, wherein the lower end surface and the upper and lower rearwardly converging surfaces together form a three-location support for a turning bit.

2. A turning assembly according to claim 1, wherein the holding elements are adjustable in at least one direction independently of each other.

3. A turning assembly according to claim 2, wherein the direction constitutes a direction of feed.

4. A turning assembly according to claim 1, further including a clamping device fixing the holding elements in the holder.

5. A turning assembly according to claim 2, wherein the holding elements are replaceable relative to the base body.

6. A turning assembly according to claim 1, further including a spacer disposed between two adjacent holding elements.

7. A turning assembly according to claim 1, wherein each holding element includes a fastener for fixing a respective turning bit in place.

8. Turning assembly according to claim 7 further including a safety structure for frictionally retaining turning bits in the holder, the safety structure including an elastically-biased structure for yieldably bearing against the turning bits and yieldable to a bit-releasing position in response to the application of a force upon the turning bit for removing the turning bit from the holder.

9. Turning assembly according to claim 1, further including a safety structure for frictionally retaining turning bits in the holder, the safety structure including an elastically-biased structure for yieldably bearing against the turning bits and yieldable to a bit-releasing position in response to the application of a force upon the turning bit for removing the turning bit from the holder.

10. Turning assembly according to claim 9, wherein the safety structure further includes an adjustment mechanism for adjusting a force which the elastically-biased structure applies against a turning bit.

11. Turning assembly according to claim 9, wherein the safety structure includes safety devices for retaining respective turning bits independently of one another, the elastically-biased structure including elastically-biased elements engageable with respective turning bits.

12. Turning assembly according to claim 11, wherein each elastically-biased element is rotatable about an axis.

13. Turning assembly according to claim 11, wherein each safety device includes a sleeve attached to the holder, the respective elastically-biased element mounted in the sleeve.

14. Turning assembly according to claim 13, wherein said sleeve is mounted in a respective bore of the holder, the elastically-biased element situated at an end of the sleeve adjacent a location where the respective bore communicates with a respective turning bit, each elastically-biased element projecting partially from its sleeve and bore to contact the respective turning bit, each sleeve including a stop for preventing the respective elastically biased element from fully exiting the end of the sleeve.

15. Turning assembly according to claim 8, further including spacers removably disposed in the holder adjacent respective holding elements for defining a position of the respective holding elements, the safety structure arranged for frictionally elastically retaining the spacers in the holder.

16. Turning assembly according to claim 1, further including spacers removably disposed in the holder adjacent respective holding elements for defining a position of the respective holding elements, and a safety structure for frictionally retaining the spacers in the holder, the safety structure including an elastically-biased structure yieldably bearing against the spacers and being yieldable to a spacer-releasing position in response to the application of a force upon a spacer for removing the spacer from the holder.

17. Turning assembly according to claim 1, further including turning bits mounted in respective holding elements, each turning bit including a center portion and a plurality of cutting parts projecting outwardly from the center portion and lying in a plane defined by the center portion, each cutting part having a cutting edge disposed at an outer end thereof; each adjacently disposed pair of cutting parts forming a recess therebetween, wherein one of the cutting parts extends into the pocket of its respective holding element, and the protrusions of the holding element are received in respective recesses of the turning bit.

18. Turning assembly according to claim 17 wherein each recess of each turning bit is formed by two edge surfaces of the turning bit which diverge away from the center portion, one of the diverging edge surfaces having a notch formed therein; each holding element having a retainer engaged in one of the notches of its respective turning bit.

19. Turning assembly according to claim 1 wherein each turning bit has exactly four cutting parts.

20. A cutting-off bit for use in a holding element, comprising a main portion and at least one cutting part projecting from the main portion and being substantially coplanar therewith, the at least one cutting part having a cutting edge at an outer free end thereof and being of essentially constant thickness; the bit further including an edge surface in which a recess is formed, and a notch formed in the edge surface adjacent the recess and adapted to receive a safety device when the bit is inserted into a holder.

21. The cutting-off bit according to claim 20 wherein the notch is formed in a surface of the recess.

22. A turning assembly comprising a holder, a plurality of turning bit holding elements mounted in the holder, and turning bits mounted in respective holding elements, the holding elements spaced apart within the holder and lying respectively in spaced-apart parallel upright planes, each holding element including a front end forming a bit seat for receiving a turning bit, the seat comprised of a pair of forwardly projecting upper and lower protrusions defining therebetween a pocket, the pocket having upper and lower rearwardly converging surfaces formed by respective ones of the protrusions, the protrusions including respective generally forwardly facing upper and lower end surfaces extending away from a forwardly open mouth of the pocket, each turning bit comprising a main portion and four cutting parts projecting from the main portion and being substantially coplanar therewith, each cutting part having a cutting edge at an outer free end thereof and being of essentially constant thickness; the bit further including an edge surface in which a recess is formed, a first of the cutting parts mounted in the pocket and engaging one of the converging surfaces thereof, second and third ones of the cutting parts engaging respective ones of the end surfaces, and a fourth cutting part disposed in an active cutting state, wherein each holding element forms a three-location support for its respective turning bit.

* * * * *